Dec. 10, 1968          G. G. SPRATT          3,415,469
AIRPLANE
Filed Sept. 22, 1966          4 Sheets-Sheet 1
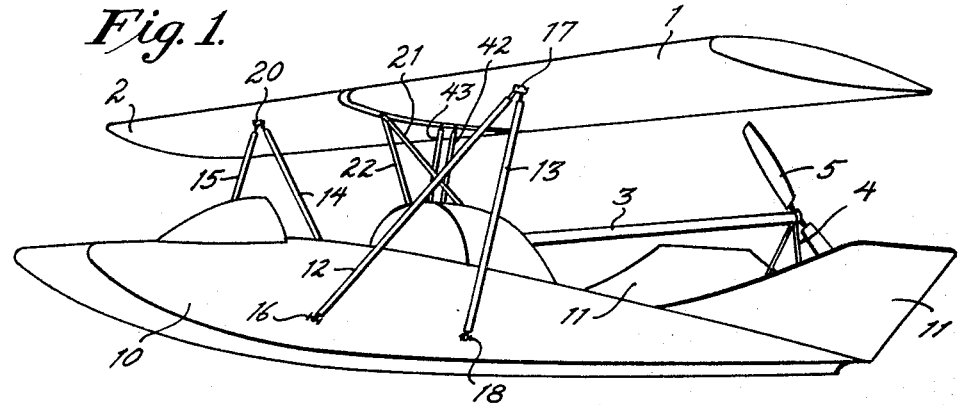
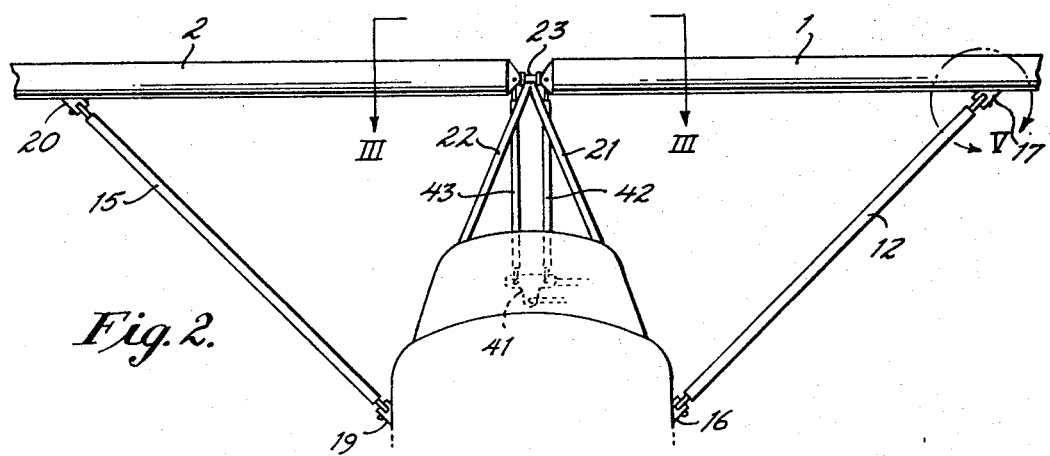
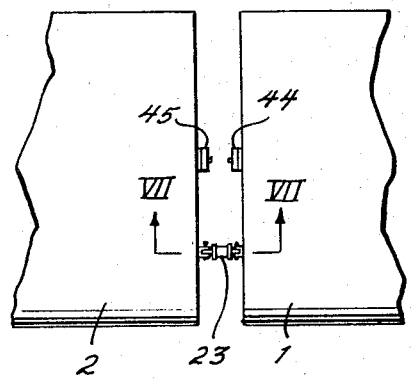
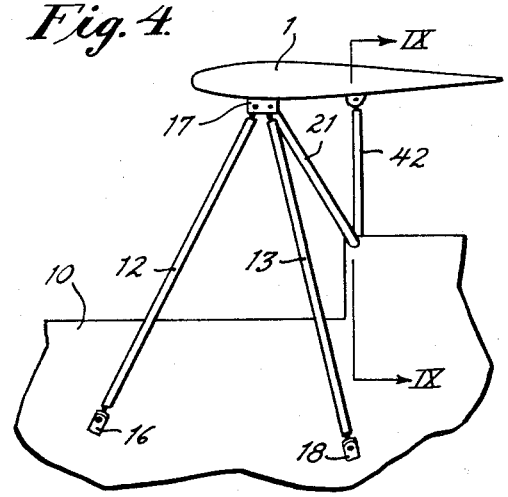
INVENTOR.
GEORGE G. SPRATT
BY Paul & Paul
ATTORNEYS.

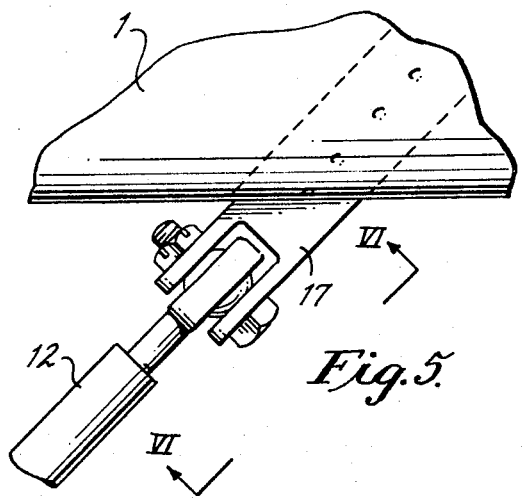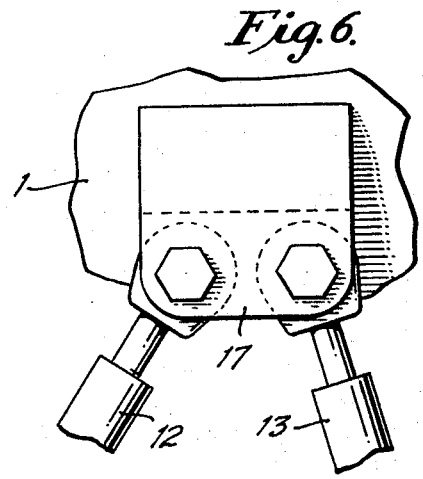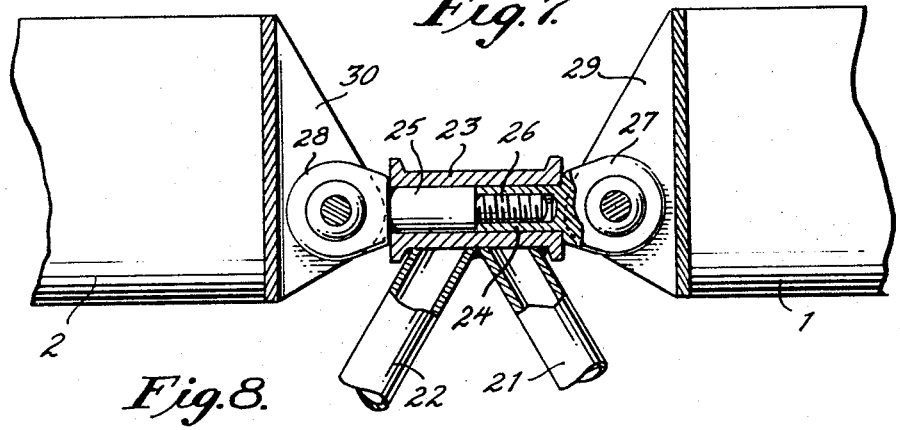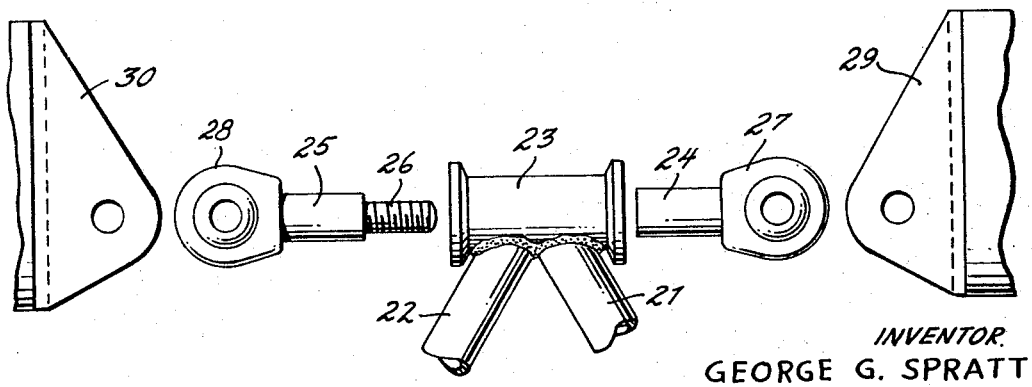

Dec. 10, 1968 G. G. SPRATT 3,415,469
AIRPLANE
Filed Sept. 22, 1966 4 Sheets-Sheet 3

INVENTOR.
GEORGE G. SPRATT
BY
Paul & Paul
ATTORNEYS.

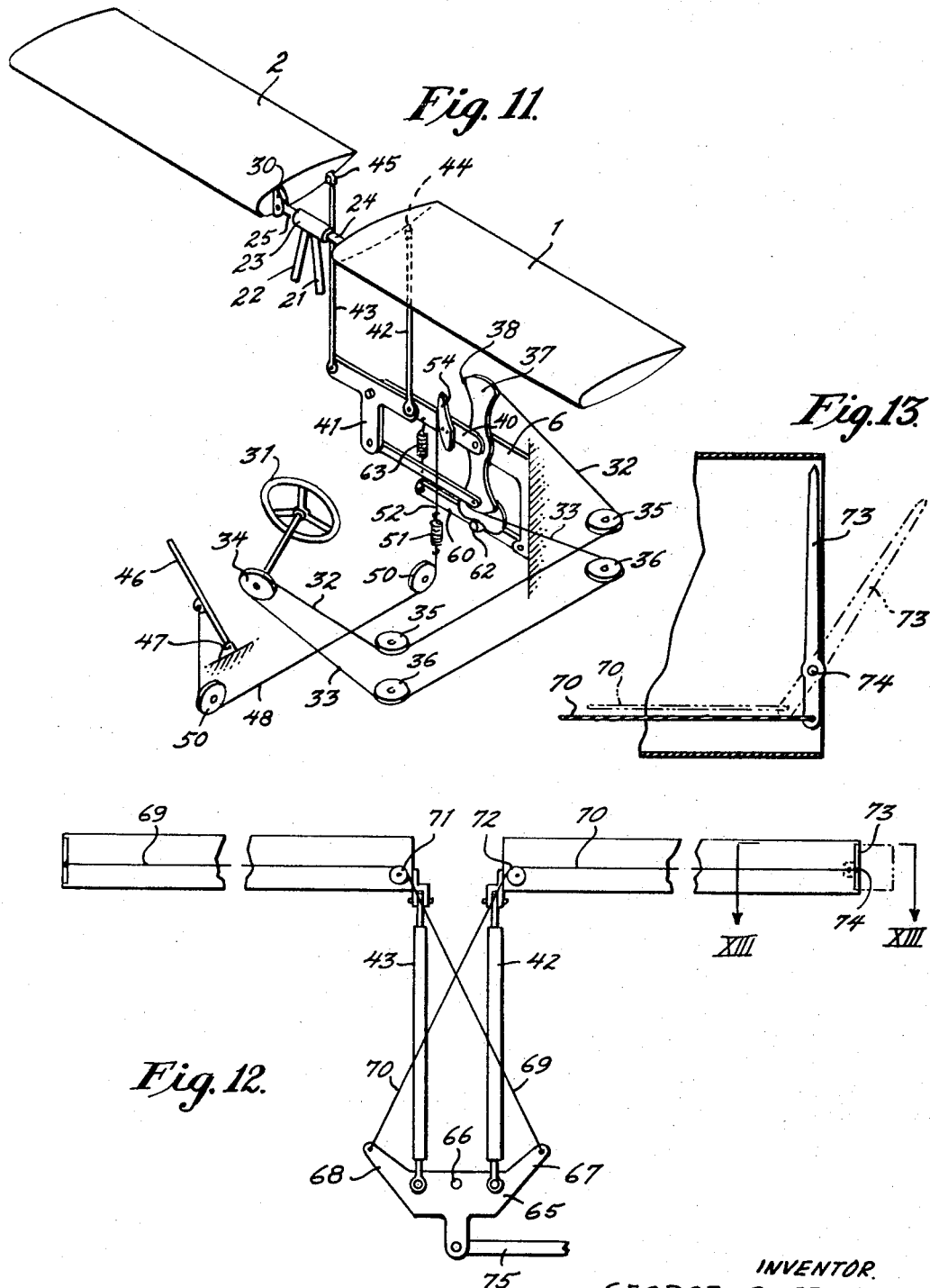

United States Patent Office 3,415,469
Patented Dec. 10, 1968

3,415,469
AIRPLANE
George G. Spratt, 110 Barley Mill Road,
Wallingford, Pa. 19086
Filed Sept. 22, 1966, Ser. No. 581,385
5 Claims. (Cl. 244—48)

ABSTRACT OF THE DISCLOSURE

An aircraft is provided having wings pivotably attached to a fuselage and free to pivot in response to aerodynamic forces and control forces and having a control system for inducing equal pivotal movement of the wings in unison in the same direction through operation of a first pilot-actuated control and for inducing differential pivotal movements of the wings through operation of a second pilot-actuated control and having means interposed between the first control and the wings for permitting the wings to pivot in unison and in the same direction in response to aerodynamic forces. A further feature of the control system consists in means for automatically adding to or subtracting from the angle of attack of both wings in unison and in the same direction on increase or decrease respectively of the pivot differential of the wings.

This invention relates generally to airplanes and more particularly to an airplane having laterally extending wings which are mounted so that they may be tilted relative to one another and relative to the fuselage about their respective axes extending substantially in spanwise directions in response to both aerodynamic and pilot control forces.

Fixed wing aircraft having wings which may be tilted relative to the fuselage, thereby changing the angle of attack of the wings, have been known for many years in various forms. An airplane of this general type is shown in U.S. Patent No. 1,806,927 which retains the usual rudder and elevator control surfaces comprising the tail of the aircraft. A more sophisticated airplane having pivotally mounted and sustaining wings is shown in my Patent No. 2,623,712 which issued Dec. 30, 1952. In this latter patent, the connection between the wings and the fuselage is in the form of a pivotal support connection which provides free movement of the entire wing about a pivotal axis parallel to the spanwise axis of the wings. While the prior pivoted wing aircraft exhibited flight characteristics which were of interest in the fixed wing aircraft field, it was found that serious control problems were encountered within certain ranges of the normal use of such pivoted wing airplanes. Consequently the fixed wing airplane art has developed primarily in the direction of a configuration in which roll control is accomplished by means of ailerons mounted on fixed wings which do not pivot and in which pitch control is accomplished by elevators mounted on the trailing edge of fixed stabilizer surfaces located aft of the center of gravity, and yaw control is accomplished by a rudder mounted on a hinge at the trailing edge of a vertically extending stabilizer positioned aft of the center of gravity. The difficulties inherent in the prior art pivoted wing aircraft have continued down to the time of the present invention.

The principal object of the present invention is to provide a fixed wing type airplane having supporting wings each capable of being tilted about their respective pivotal axes extending generally in a spanwise direction together with a control system operative to provide directional control and speed control by applying control forces to tilt said wings about their pivotal axes.

A further object of this invention is to provide a control system for airplanes having wings free to tilt independently about their respective spanwise axes in response to aerodynamic forces.

A still further object of this invention is to provide a control system for aircraft having pivotal wings in which control of the airplane is accomplished by changes in the position of controls available to the pilot, which control changes exert forces which are exerted on the pivotally mounted wings in addition to aerodynamic forces which likewise are exerted on said pivotally mounted wings when the airplane is in flight, thereby providing an airplane having pivoted wings simultaneously responsive to both a pilot control system and to aerodynamic forces.

A further object is to provide in such a control system an increase in the angle of attack of both wings when the pilot control is operated to provide roll and turn.

A still further object is to provide means in such a system whereby increase of either wing beyond a predetermined critical angle of attack is prevented while permitting changes to continue in the angle of attack of the other wing.

A further object is to provide means in such a system for counteracting undesirable yaw effects.

A preferred embodiment of the present invention is shown in the accompanying drawings in which:

FIGURE 1 is a perspective view of an airplane incorporating the features of the present invention in the form of a flying boat;

FIGURE 2 is a fragmentary front elevational view of the aircraft of FIGURE 1;

FIGURE 3 is a plan view taken as indicated by the arrows III—III on FIGURE 2;

FIGURE 4 is a fragmentary side elevational view of the aircraft of FIGURE 1;

FIGURE 5 is an enlarged detail view of the area indicated by the designation V in FIGURE 2;

FIGURE 6 is a view taken as indicated by the arrows VI—VI on FIGURE 5;

FIGURE 7 is an enlarged sectional view taken as indicated by the arrows VII—VII on FIGURE 3;

FIGURE 8 is an exploded view in elevation of the elements shown in FIGURE 7;

FIGURE 11 is a perspective view of the control system and the pivoted wings;

FIGURE 12 is a diagrammatic showing of a modified form showing drag flap yaw control means; and FIGURE 13 is an enlarged section taken as indicated by the arrows XIII-XIII on FIGURE 12.

Figures 9, 10:
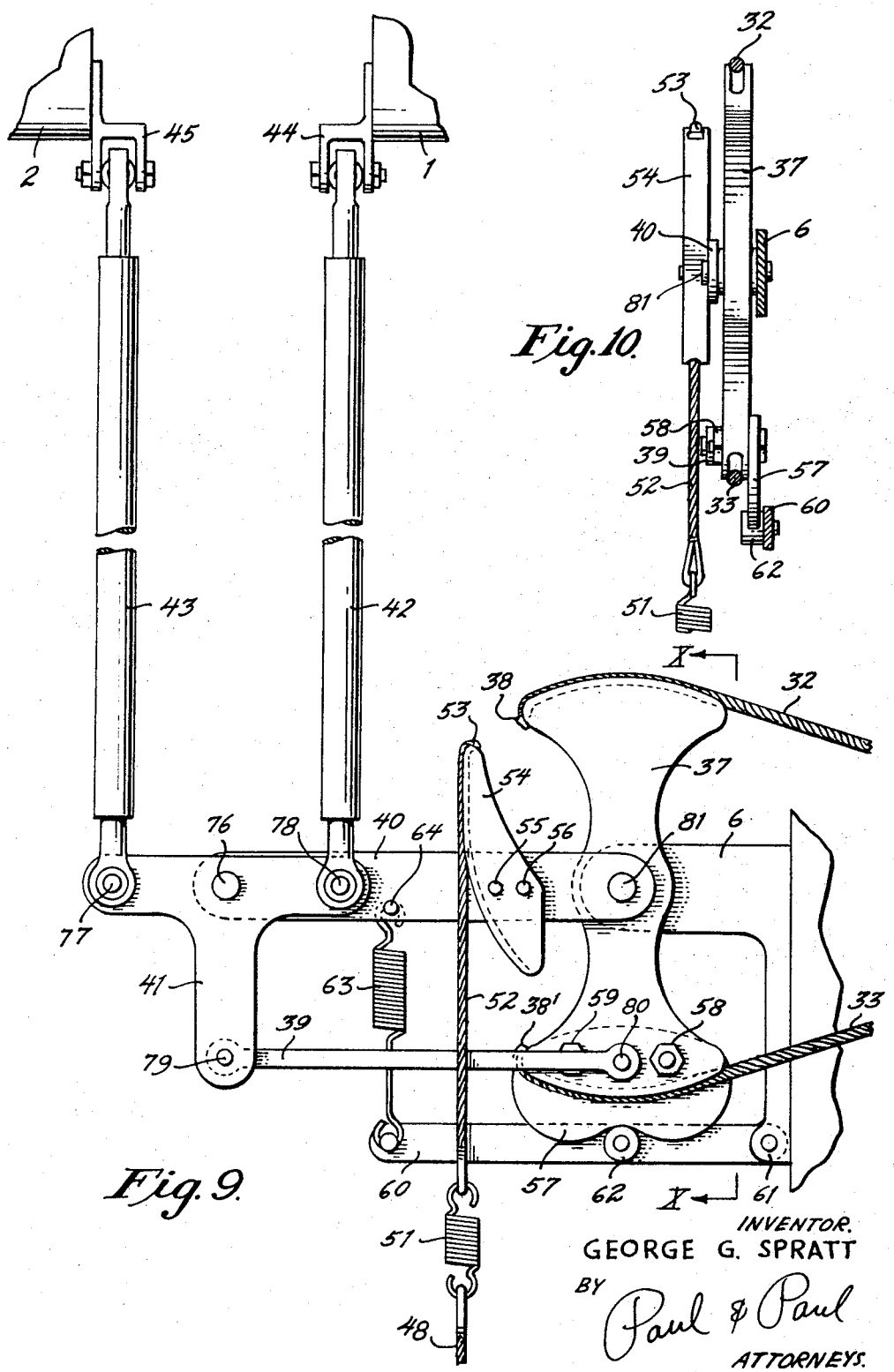
FIGURE 9 is an enlarged front elevational view taken as indicated by the arrows IX—IX on FIGURE 4 and showing elements of the control system.
FIGURE 10 is a cross section taken as indicated by the arrows X—X on FIGURE 9.

In the drawings, the fuselage or body of an aircraft is shown at 10 having laterally and upwardly extending surfaces 11 mounted at the rear. Attached to the fuselage by means of struts 12, 13, 14 and 15 and supported also by upwardly extending support members 21 and 22 are two laterally extending wings 1 and 2 which are secured to the strut members by fittings as shown at the wing fittings 17 and 20. Fuselage fittings 16 18, 19 and a fourth fitting (not shown but corresponding to 18) are provided for attaching struts 12, 13, 14 and 15 to fuselage 10. Extending rearwardly from a power plant (not shown) is a drive shaft 3 which is supported by an upwardly extending V-frame 4 and to which there is attached a propeller 5 arranged to operate as a pusher. As shown in FIGURES 2 and 8, the support members 21 and 22 terminate at their upper ends in a central support 23 which has an opening to receive an interiorly threaded tube 24 from the left side of the aircraft (looking forward) and a tube 25 having a threaded projection 26 from the right side of the aircraft. Fitting 27 is provided for attaching tube 24 to the left wing at wing fitting 29, and fitting 28 is provided for attaching tube 25 to the right wing fitting 30. These attachments are made after the tubes 24 and 25 have been put into threaded engagement within fitting 23 as shown in FIGURE 8. Limited relative rotation of elements 24 and 25 is thus made possible.

Within the cockpit of the aircraft there is provided control member 31 which is operatively connected to cables 32 and 33, as shown in FIGURE 11. These cables extend around pulleys 34, 35 and 36, and at their ends are attached to sector 37 by means of attachment fittings 38 and 38' respectively, as shown in FIGURE 9. Mounting bracket 6 which is fixedly attached to the fuselage is provided for the pivotal mounting of sector 37, as shown in FIGURES 9 and 11. Push rod 39 is pivotally attached to sector 37 at its lower end and is likewise pivotally attached to T-crank 41. Arm 40 is likewise pivotally attached to bracket 6 and has at its opposite end a pivot mounting point for T-crank 41. Push rods 42 and 43 are attached to the separate ends of T-crank 41 and extend upwardly to fittings 44 and 45 which are attached respectively to wings 1 and 2.

Returning now to the cockpit of the aircraft, there is shown in FIGURE 11 a control stick 46 which is pivotally attached to a fixed member 47. Cable 48 is attached to stick 46, passes around pulleys 50 and its far end is attached to the lower end of spring 51. Cable 52 is attached to the upper end of spring 51 and extends to attachment means 53 located at the top of arm 54. Arm 54 is fixedly attached to arm 40 at the points 55 and 56, as shown in FIGURE 9.

Returning to sector 37, there is attached thereto a cam member 57 by means of fastening elements 58 and 59. The cam member 57 engages a cam follower 62 mounted on an arm 60 which is pivotally mounted on extension 61 of bracket 6. Attached to the other end of arm 60 there is a spring 63 which is fixedly attached at its upper end to arm 40 by means of attachment pin 64.

In the modification shown in FIGURES 12 and 13, a modified T-crank 65 is provided to which push rods 42 and 43 are attached but which also is provided with arms 67 and 68 to which cables 69 and 70 are attached. Pulleys 71 and 72 are provided for cables 69 and 70 respectively. These cables extend to an attachment point on drag flap 73 which, as shown in FIGURE 13, is pivotally mounted in wing 1 on pivot point 74. As shown in FIGURE 12, actuation of control rod 75 will cause T-crank 65 to rotate around pivot point 66, and this will result in a flap extension action at the wing whose angle of attack is being decreased by pilot control action.

Having described a preferred embodiment of the present invention in terms of structure, I will now describe the operation of these elements in a controlled flight of the aircraft.

Starting with the aircraft on the surface, it is apparent that its rate of forward motion will be determined by the propeller thrust and the total drag. This is controlled by the throttle (not shown) and by any of the usual pitch control mechanisms for the propeller. Beginning at some minimum forward air speed, as determined by the position of control stick 46, there will be for a given load an angle of attack of wings 1 and 2 which will be sufficient to lift the aircraft from the surface in controlled flight. This angle of attack is automatically achieved by the wings in response to aerodynamic forces. At any given position of control stick 46, the air speed in flight will remain substantially constant. Changes in the throttle setting will cause changes in altitude. Changes to new constant air speeds will occur on changes in the position of stick 46. With the aircraft in flight, and assuming no problems of roll control or turn control, the stick 46 will now act as a speed control since it will set up an angle of attack reference about which the aerodynamic forces will act. At the same time the throttle will act as the climb or descent control. Control stick 46 may be held in fixed position by locking means (not shown).

In order to control the aircraft around its roll axis, which likewise will provide turn control, the wheel 31 is rotated to the right or to the left as viewed by the pilot. On a rotation of wheel 31 to the left, cable 33 is pulled toward wheel 31 and, therefore, sector 37 is rotated in a counterclockwise direction looking aft as in FIGURES 9 and 11. This counterclockwise rotation of sector 37 will produce a counterclockwise rotation of T-crank 41 and consequently a control rod 42 will move upward and control rod 43 will move downward. Since attachment fittings 44 and 45 are both positioned aft of the axis of rotation of the wings 1 and 2, an upward motion of push rod 42 will produce a decrease in the angle of attack of wing 1 and a downward motion of push rod 43 will produce an increase in the angle of attack of wing 2. This difference in angle of attack will produce an increase in the lift of wing 2 and a decrease in the lift of wing 1 and, therefore, the aircraft will roll to the left and turn to the left.

In order to compensate for the apparent added load created by the centrifugal forces generated in a turn, an added angle of attack is automatically applied to both wings when the pilot control 31 is operated to produce roll. This is accomplished by the action of cam 57 on cam follower 62 which causes arm 60 to move downwardly. This takes place in both directions of roll or turn and puts a downward force on arm 40 and consequently a downward force simultaneously and equally on rods 42 and 43.

Since the individual left and right wings of the aircraft of my invention are free to respond to aerodynamic forces, it is important to select an airfoil for these wings which will provide a proper response. The ideal airfoil for this invention is one in which, throughout the flight range, each increment of change in air speed will cause a corresponding change in the distance between the flight vector and the wing hinge. The direction of this motion should be such that an increase in air speed causes the vector to move forward and a decrease causes the vector to move aft. At either end of the flight range, the vector should continue to move in the same direction but at a much faster rate. Of the airfoils presently known to me, N.A.C.A. 23112 most closely approaches this ideal and, therefore, is the airfoil I prefer in the present invention. However, the invention is not limited to this specific airfoil since substantially equivalent air foils may be used.

When the lift vector of either wing 1 or wing 2 moves sufficiently far aft a couple is produced which is in the direction of forward tilt of the wing. This force is transmitted into the control system where it is resolved with forces from the other wing and with pilot control forces through pivot points 76, 77, 78, 79, 80 and 81 and the associated T-crank 41 and arms 39 and 40. This resolution of forces effectively prevents an increase in the angle of attack of either wing to a critical angle with respect to stall. For instance, if the aircraft is flying at the peak of the lift curve of both wings and the pilot moves control wheel 31 to cause a hard right turn, further increase in the angle of attack of the left wing will not take place even though the control wheel motion would seem to be in a direction to cause T-crank 41 to rotate in a clockwise direction about pivot point 76. What actually occurs is that push rod 42 meets rapidly increasing resistance to downward movement as the lift vector at wing 1 starts moving rapidly aft. At the same time rod 43 meets only linear resistance to upward motion. The result is that T-crank 41 rotates about pivot 78 rather than pivot 76 while arms 39 and 40 rotate slightly around pivots 80 and 81. The net result is that wing 1 continues to fly substantially at the peak of the lift curve while substantially all of the control motion goes to decreasing the angle of attack of wing 2. This causes a roll to the right and a turn to the right. A similar resolution of forces takes place in the event control wheel 31 is rotated to the left at a time when wing 2 is operated at the peak of its lift curve. Under such conditions, push rod 43 will meet rapidly increasing resistance to downward movement while push rod 42 will move upward causing T-crank 41 to rotate about pivot 77. A left turn will take place since the angle of attack of wing 1 will be decreased while the angle of attack of wing 2 will remain substantially unaffected. For moderate wing span dimensions, the yaw induced in turning is not sufficiently great to creat a problem. However, for longer wing spans, the modification shown in FIGURES 12 and 13 is helpful in counteracting such yaw effects. This is accomplished by automatically extending flap 73 for the wing positioned at the inside of the turn. This creates a drag to counterbalance the drag created by the greater angle of attack of the wing at the outside of the turn. This occurs automatically since rod 75 in FIGURE 12 corresponds to rod 39 of FIGURE 9 and modified T-crank 65 corresponds to T-crank 41. The remaining structure of FIGURE 9 remains the same in those cases where the modification of FIGURE 12 is incorporated in the control system.

I have described the present invention by reference to a mechanical control system operating directly on the tiltable wings through push rods. It should be understood that other control means could be employed. For instance, movable tabs mounted on each wing could be used or the respective hinge points of the wings could be made movable.

It should also be noted that the wings of the aircraft of the present invention in effect are "floating" since they are free to rock or not rock not only with respect to the fuselage but also while pilot control forces are being applied. Consequently the pilot control forces at the wings have superimposed aerodynamic forces to which the wings will automatically and independently respond in unison without imposing position changes at the pilot control means. There is thus provided a controllable and safe aircraft which will fly at a selected, constant air speed with wings independently responsive in unison to aerodynamic forces.

Where the wings 1 and 2 are of relatively short span, the increased drag of the wing having the higher angle of attack will not introduce objectionable yaw effects. However, for wings of longer span, some provision to counteract yaw should be made. Means for accomplishing this are shown in FIGURES 12 and 13 in which a drag flap is automatically extended from the wing undergoing a decrease in angle of attack. The flap surface and the extent of its extension is calculated to balance the increase in drag occurring in the wing undergoing increase in angle of attack.

I claim:

1. An aircraft comprising a fuselage, left and right wings each having a pivotable connection to said fuselage, said connections providing movement of each wing about a pivotal axis substantially parallel to its spanwise axis in response to aerodynamic and control forces and a control system operatively connected to each of said wings consisting of a first single pilot-actuated control means adapted to directly produce, through elements in said control system, equal pivotal movement of each of said wings both in the same direction of rotation, a second single pilot-actuated control means adapted to produce equal and opposite differential pivotal movements of said wings about their respective pivotal axes, and yielding means operatively connected to said first pilot means and said wings for permitting the wings to pivot in unison and in the same direction in response to aerodynamic forces on said wings.

2. The aircraft of claim 1 further characterized by means for limiting further pivotal motion of either wing in the direction of increased angle of attack on approach to a predetermined critical angle of attack for that wing while permitting pivotal movement of the other wing in either direction in response to movement of said control means.

3. The aircraft of claim 1 further characterized by means for automatically applying an addition to the angle of attack of both wings when the second pilot-actuated control means is operated to increase the pivot differential of said wings and for automatically applying a subtraction to the angle of attack of both wings when the second pilot-actuated means is operated to decrease the pivot differential of said wings.

4. The aircraft of claim 1 further characterized by means for automatically extending a drag surface on the low wing when the second pilot-actuated control means is operated to increase the pivot differential of said wings.

5. The aircraft of claim 3 further characterized by means for automatically extending a drag surface on the low wing when the second pilot-actuated control means is operated to increase the pivot differential of said wings.

References Cited

UNITED STATES PATENTS

| | | | |
|---|---|---|---|
| 1,171,162 | 2/1916 | Alday | 244—48 X |
| 1,806,927 | 5/1930 | Aldrich | 244—48 |
| 1,844,448 | 2/1932 | Spamek | 244—48 |
| 1,855,574 | 4/1932 | Hubert | 244—48 |
| 1,856,093 | 5/1932 | Ford et al. | 244—48 |
| 2,362,224 | 11/1944 | Roseland | 244—48 |
| 2,461,669 | 2/1949 | Wiley | 244—48 |
| 2,504,767 | 4/1950 | Wallis | 244—48 |
| 2,900,148 | 8/1959 | Nickels | 244—83 |

MILTON BUCHLER, *Primary Examiner.*

R. A. DORNON, *Assistant Examiner.*

U.S. Cl. X.R.

244—83, 90